US009075624B2

(12) United States Patent
Carrillo

(10) Patent No.: US 9,075,624 B2
(45) Date of Patent: Jul. 7, 2015

(54) COMPILATION OF SYSTEM DESIGNS

(71) Applicant: Xilinx, Inc., San Jose, CA (US)

(72) Inventor: Jorge E. Carrillo, San Jose, CA (US)

(73) Assignee: XILINX, INC., San Jose, CA (US)

( * ) Notice: Subject to any disclaimer, the term of this patent is extended or adjusted under 35 U.S.C. 154(b) by 87 days.

(21) Appl. No.: 13/925,501

(22) Filed: Jun. 24, 2013

(65) Prior Publication Data

US 2014/0380287 A1 Dec. 25, 2014

(51) Int. Cl.
*G06F 9/45* (2006.01)
*G06F 17/50* (2006.01)

(52) U.S. Cl.
CPC .............. *G06F 8/41* (2013.01); *G06F 17/5054* (2013.01); *G06F 2217/86* (2013.01)

(58) Field of Classification Search
None
See application file for complete search history.

(56) References Cited

U.S. PATENT DOCUMENTS

| | | | |
|---|---|---|---|
| 7,941,791 B2 | 5/2011 | Wang et al. | |
| 8,190,807 B2 | 5/2012 | Reid et al. | |
| 8,533,503 B2 | 9/2013 | Lippett | |
| 8,533,716 B2 | 9/2013 | Lippett | |
| 2002/0157080 A1* | 10/2002 | Kato et al. | 716/18 |
| 2004/0020612 A1 | 2/2004 | Bosio | |
| 2004/0139428 A1 | 7/2004 | Chuang et al. | |
| 2005/0223382 A1 | 10/2005 | Lippett | |
| 2006/0041872 A1* | 2/2006 | Poznanovic et al. | 717/140 |
| 2007/0220294 A1 | 9/2007 | Lippett | |
| 2008/0256330 A1 | 10/2008 | Wang et al. | |
| 2010/0131934 A1 | 5/2010 | Kim et al. | |
| 2010/0161306 A1* | 6/2010 | Burgun et al. | 703/20 |
| 2012/0096445 A1 | 4/2012 | Berg et al. | |
| 2013/0007730 A1 | 1/2013 | Hotra et al. | |
| 2013/0031554 A1 | 1/2013 | Hou et al. | |
| 2013/0144589 A1* | 6/2013 | Levi | 703/14 |

OTHER PUBLICATIONS

Altera Corp., *Nios II C2H Compiler User Guide*, Nov. 2009, v9.1, pp. 1-1 to 7-10, Altera Corp., San Jose, California 95134, USA.
Canis, Andrew et al., "LegUp: High-Level Synthesis for FPGA-Based Processor/Accelerator Systems," *Proc. of the 19th ACM/SIGDA International Symposium on Field Programmable Gate Arrays*, Jan. 1, 2011, pp. 33-36, ACM, New York, New York, USA.
Edwards, M. D. et al., "Software acceleration using programmable hardware devices," *IEE Proceedings: Computers and Digital Techniques*, Jan. 25, 1996, pp. 55-63, vol. 143, No. 1, IEEE, Piscataway, New Jersey, USA.

(Continued)

*Primary Examiner* — Don Wong
*Assistant Examiner* — Daxin Wu
(74) *Attorney, Agent, or Firm* — LeRoy D. Maunu

(57) ABSTRACT

A method is provided for compiling an HLL program. A command is input that indicates a set of HLL source files to be compiled and a set of functions in the HLL source files that are to be implemented on programmable circuitry of a programmable IC. For a source file including one of the set of functions, a respective netlist is generated from HLL code of each of the set of functions included therein. Interface code is also generated for communication with the netlist. HLL code of the set of functions in the HLL source file is replaced with the generated interface code. Each HLL source file is compiled to produce a respective object file. The object files are linked to generate a program executable on the programmable IC. A configuration data stream is generated that implements each generated netlist on the programmable IC.

16 Claims, 7 Drawing Sheets

(56) References Cited

OTHER PUBLICATIONS

Klein, Russell A. et al., "Migrating Software to Hardware on FPGAs," *Proc. of the 2004 IEEE International Conference on Field Programmable Technology*, Dec. 6, 2004, pp. 217-2224, IEEE, Piscataway, New Jersey, USA.

Lau, David et al., "Automated Generation of Hardware Accelerators with Direct Memory Access from ANSI/ISO Standard C Functions" *Proc. of the 14th Annual IEEE Symposium on Field-Programmable Custom Computing Machines*, Apr. 1, 2006, pp. 45-56, IEEE, Piscataway, New Jersey, USA.

Specification and drawings from U.S. Appl. No. 13/776,318, filed Feb. 25, 2013, Kathail et al.

Xilinx, Inc., *AutoSEL User Guide*, UG867 (v 2011.4), Oct. 2011, pp. 1-169, Xilinx. Inc., San Jose, California, USA.

* cited by examiner

COMPILATION OF SYSTEM DESIGNS

TECHNICAL FIELD

The disclosure generally relates to the development of system designs using high-level languages (HLLs).

BACKGROUND

Programmable integrated circuits (ICs) may be programmed by a user to perform specified logic functions. One type of programmable IC, known as a field programmable gate array (FPGA), typically includes programmable resources that are arranged in an array of programmable tiles including, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Programmable ICs provide flexible hardware solutions that are advantageous for high performance parallel computing in advanced digital communications and video applications. For many complex applications, it may be desirable to implement a portion of the design in software (a program design) and a portion of the design in programmable resources. Many manufacturers, such as Xilinx, Inc., include embedded processor systems in a number of programmable ICs. These embedded processor systems can meet both software and hardware programmable needs. Embedded processor systems often include operating memory, software instruction storage, input/output, and other components of a computer system. These systems are referred to as system on chip (SOC) solutions. In these systems, designers may implement complex functions in programmable logic to increase efficiency and throughput. This architectural combination gives an advantageous mix of serial and parallel processing, flexibility, and scalability, thereby enabling a more optimized system partitioning.

Current SOC digital hardware design is done using hardware description languages (HDLs) such as Verilog and VHDL. These languages provide special constructs to handle the description of digital hardware-specific entities such as registers and clocks. While these languages are effective in describing hardware circuits, they provide little in the way of high-level abstractions to manage the complexity of modern designs. In contrast, modern software languages, and in particular object-oriented high-level languages (HLL) such as Java and C++ provide robust high-level constructs that are very effective at managing complexity and serve to improve designer productivity as well as design quality. Synthesizing compilers have been created to infer and perform hardware synthesis to generate hardware circuits configured to implement an HLL design. The ability to describe circuits using an HLL allows a designer to focus on the algorithms, rather than the implementation details.

SUMMARY

In one embodiment, a method is provided for compiling an HLL program. A command is input that includes a first field that indicates a set of one or more HLL source files to be compiled. The command also includes a second field that indicates a set of one or more functions that are to be implemented on programmable circuitry of a programmable IC. In response to a source file including one or more functions of the set, for each of the one of more functions of the set, a respective netlist is generated from HLL code included in the function. Interface code is also generated for communication with the netlist. HLL code of the function in the HLL source file is replaced with the generated interface code. Each HLL source file is compiled to produce a respective object file. Each of the object files is linked to generate a program executable on the processor of the programmable IC. A configuration data stream is generated that implements each generated netlist on the programmable circuitry of the programmable IC.

In another embodiment, a method is provided for compiling an HLL program. In response to a first command, having a first field that indicates a set of one or more HLL source files to be compiled and a second field that indicates a set of one or more functions that are to be implemented on programmable circuitry of a programmable IC, HLL source files of the set are parsed to locate the set of one or more functions. In response to a source file including one or more functions of the set, for each of the one or more functions of the set, a respective netlist is generated from HLL code included in the function. In further response to the source file including one or more functions of the set, HLL interface code is generated for communication with the netlist. HLL code of the function in the copy of the HLL source file is replaced with the generated HLL interface code. Each of the HLL source files are compiled to produce a respective object file. In response to a second command, each of the object files is linked to generate an executable program configured for execution on the processor of the programmable IC. A configuration data stream that implements each generated netlist on the programmable circuitry of the programmable IC is generated.

Other embodiments will be recognized from consideration of the Detailed Description and Claims, which follow.

BRIEF DESCRIPTION OF THE DRAWINGS

Various aspects and features will become apparent upon review of the following detailed description and upon reference to the drawings, in which.

DETAILED DESCRIPTION

Figure 1:
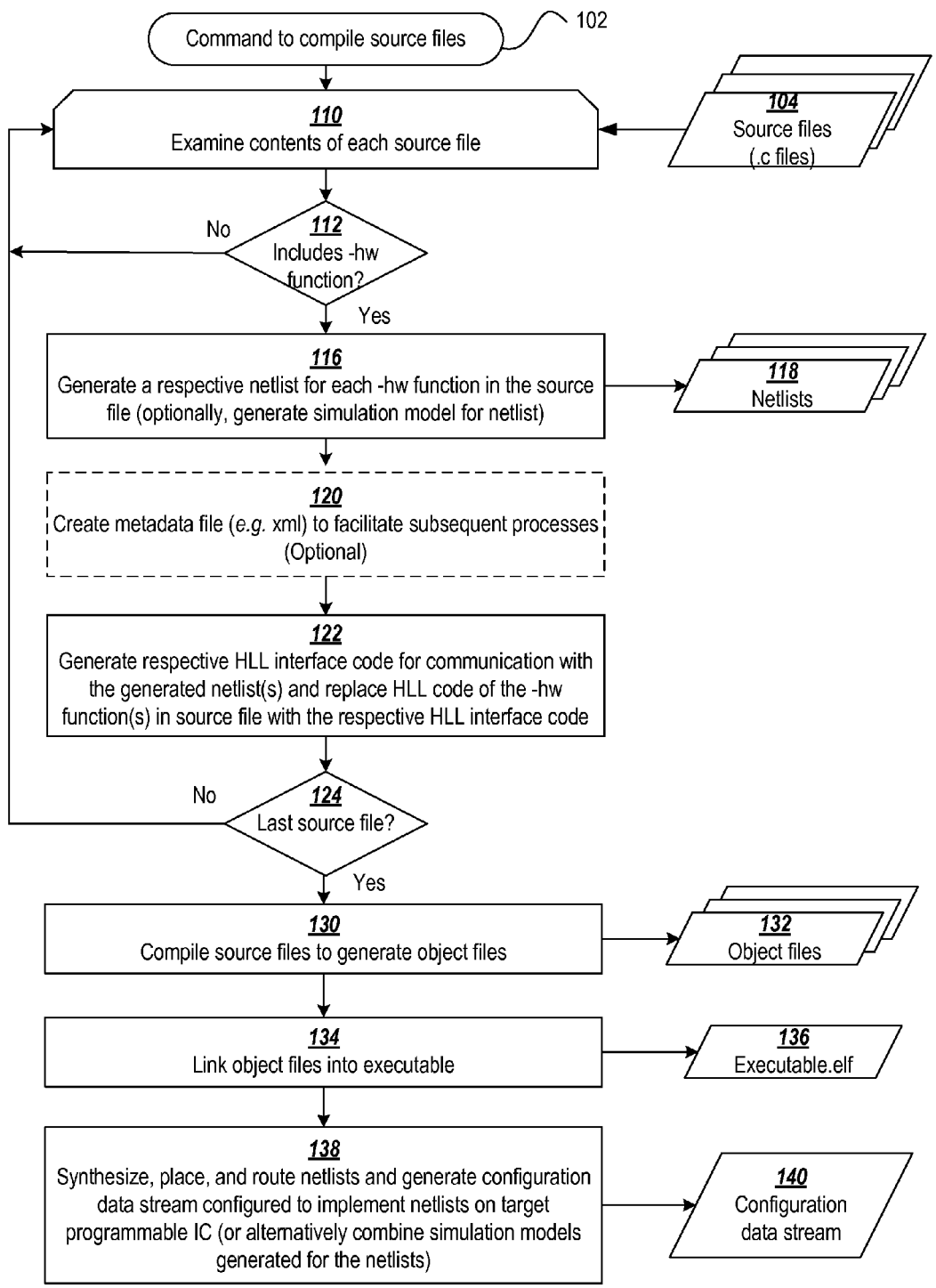
FIG. 1 shows a process for compiling an HLL program.

Methods and systems are disclosed for compiling programs written in HLL programming languages (such as C or C++) that are to be implemented in devices that integrate processors with programmable logic resources (such as XILINX Zynq™ SOCs) without a need to write any hardware description language code (such as VHDL or Verilog) or any interface between them. More specifically, methods and systems are configured to compile an HLL program to implement a first portion of the HLL program using a processor of the SOC, and a second portion of the HLL program using programmable circuitry of the SOC.

A command line interface is provided for compiling HLL designs targeted to SOCs. Such a command line interface is intuitive and allows easy adoption by software developers and easy integration with current software build tools (such as make) and more sophisticated software development environments (such as Eclipse). From a user perspective, the compiler flow is similar to that of modern compilers (e.g., gcc and g++). In some implementations, programmers can create software libraries (such as *.a files) because the object files that include the interface to communicate with the hardware as well as the hardware itself can be archived in the same object files (*.o). This enables third parties to engage in the business of creating software libraries that actually make use of the programmable logic in a standard way.

One method for compiling an HLL program includes inputting a command having a first field that indicates a set of one or more HLL source files to be compiled and a second field that indicates a set of one or more functions that are to be implemented on programmable circuitry of a programmable IC. For ease of reference, functions to be implemented on programmable circuitry of a programmable IC may be referred to as hardware-accelerated functions. In response to the input command, netlists are generated to implement hardware accelerated functions of the source files. Each HLL source file of the set is also compiled and linked together to form a processor executable file to implement a first set of non-hardware-accelerated functions of the source files.

Source files are compiled differently depending on whether the source file includes hardware-accelerated functions indicated in the second field. If a source file includes one or more functions of the set, a respective netlist is generated for each of the one of more functions of the set (e.g., using an HLL synthesis tool). For each of the one or more functions of the set, interface code is generated for communication with the corresponding netlist, and HLL code of the function in the HLL source file is replaced with the generated interface code.

All of the source files (as modified) are then compiled to produce respective object files. The object files are linked to generate a program executable on the processor of the programmable IC. A configuration data stream is generated that implements each generated netlist on the programmable circuitry of the programmable IC.

Turning now to the figures, FIG. 1 shows a process for compiling an HLL program in accordance with one or more implementations. The process is initiated by a command 102 having a first field that indicates a set of one or more HLL source files to be compiled and a second field (indicated by an -hw option) that specifies a set of one or more functions of the source files that are to be implemented on programmable circuitry of a programmable IC. In response to a command 102 (e.g., terminal command or executable script command), each source file 104 indicated by the command is examined at block 110. For each source file, if the source file includes one or more functions indicated by the -hw option in the command, decision block 112 directs the process to block 116 where a netlist 118 is generated for the functions. The netlist includes register-transfer-level (RTL) code describing a circuit configured to implement the function in hardware. Optionally, in some implementations, a simulation model may also be generated for the netlists at block 116. A metadata file (e.g., an xml file) may be created at block 120 to facilitate subsequent processes (e.g., linking). For instance, for each function specified by the -hw option, the metadata may include data pointers to various files associated with the functions to be implemented in hardware (e.g., source files, object files, and/or netlists corresponding to the function. A respective set of HLL interface code is generated at block 122 for communication with the generated netlist(s). The function(s) in the source file specified by the -hw option are also replaced by the corresponding HLL interface code at block 122.

The processes performed at blocks 110, 112, 116, 120, and 122 are repeated for each source file 104 until the last source file has been processed, as indicated by decision step 124. After which, the source files are compiled at block 130 to generate object files 132. Object files 132 are linked into an executable file 136 (e.g., an .elf file) at block 134. Netlists are synthesized, placed, and routed for target programmable circuitry at block 138. Also at block 138, a configuration data stream 140 that is configured to implement the netlists on the target programmable IC is also generated. Alternatively, simulation models generated for the netlists (e.g., at block 116) are combined into a single simulation model.

Figure 2:
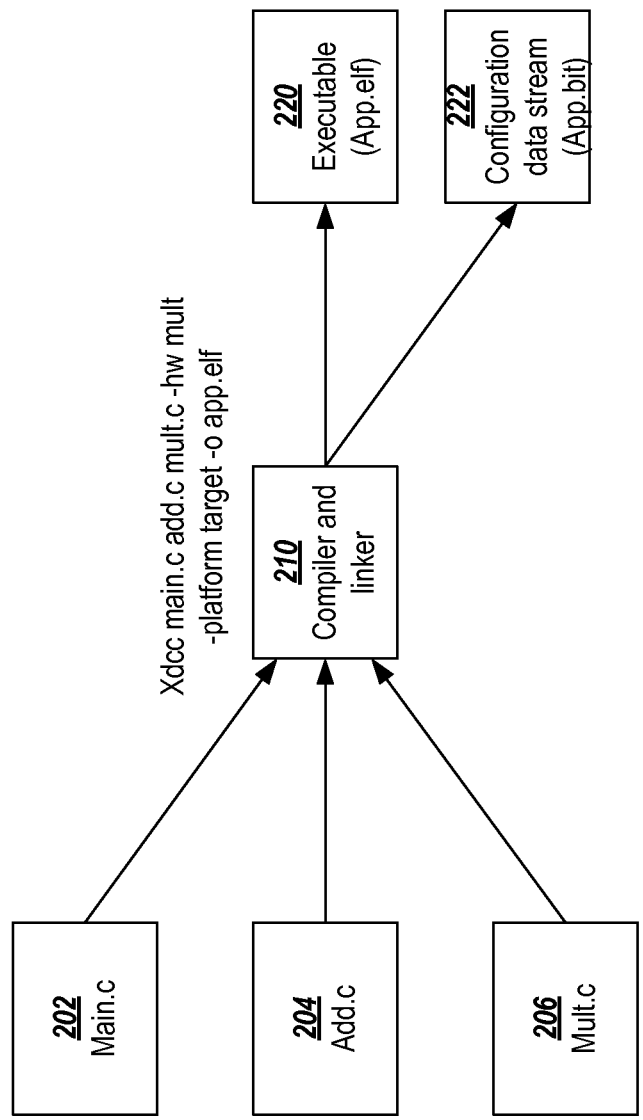
FIG. 2 shows a first example flow for the compilation of source files.

FIG. 2 shows a first example flow diagram for the compilation and linking of source files. The example shown in FIG. 2 illustrates compilation and linking of three source files (202, 204, and 206) in response to the following command:

xdcc main.c add.c mult.c -hw mult -platform target -o app.elf,

The command in this example causes object files (not shown) to be created and linked by compiler and linker process 210 to form executable program file 220 and configuration data stream 222. The -o option causes the generated object files (not shown) to be removed after compilation has completed.

As described with reference to FIG. 1, the -hw option causes the compiler and linker 210 to generate a configuration data stream 222 to implement function "mult" in programmable circuitry of an IC indicated by the -platform option in the command. The -hw option also causes the compiler and linker 210 to replace the mult function (specified by the -hw option in the command) in the source files with interface code to facilitate communication between other functions of the source files and the hardware implementation of the mult function. The interface code causes function calls in the executable program 220 to the mult function to be forwarded to a circuit configured to implement the mult function in hardware resources.

The modified source files are compiled to create executable program file 220 with the name indicated in the command (e.g., app.elf).

Figure 3:
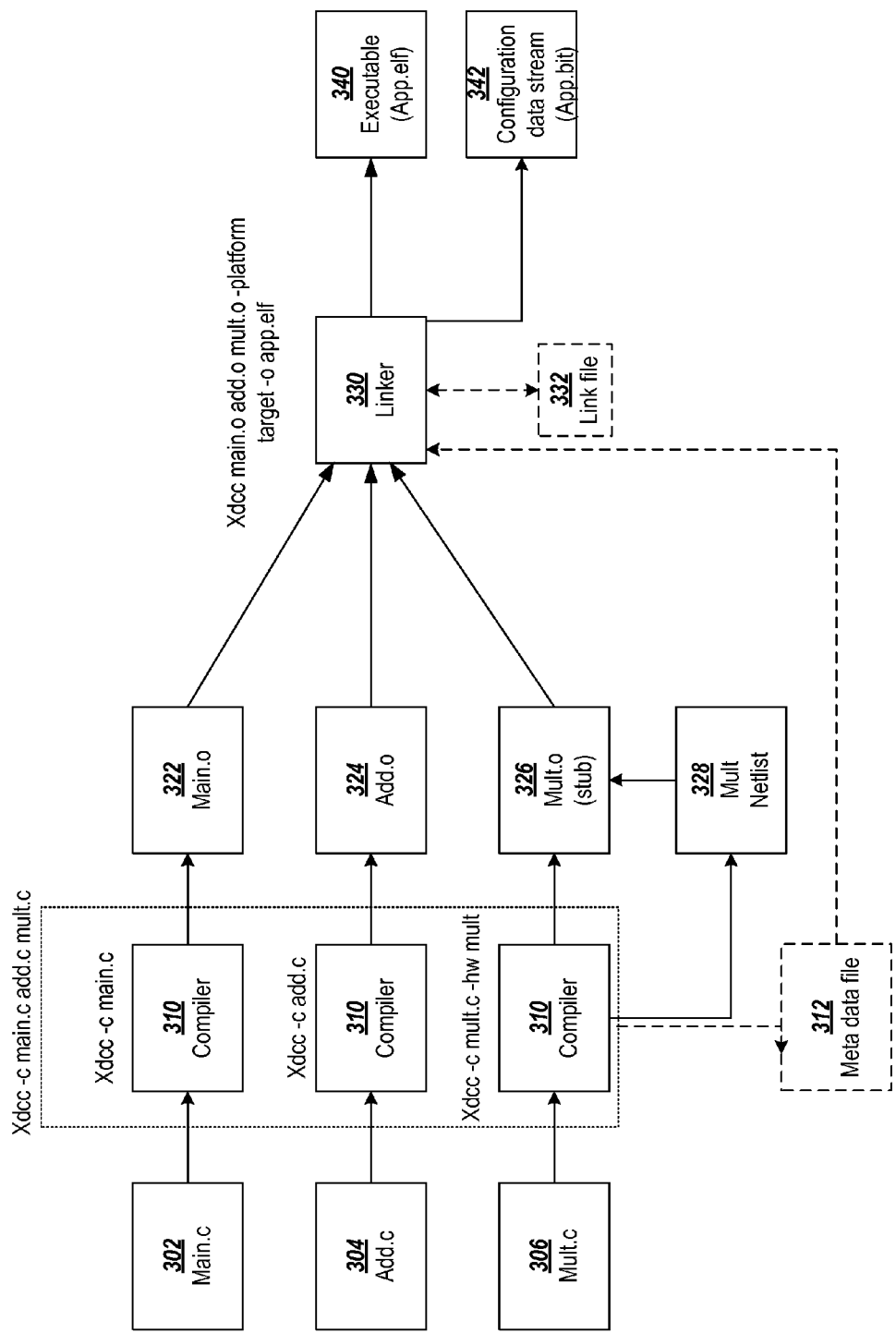
FIG. 3 shows a second example flow for the compilation of source files.

FIG. 3 shows a second example flow diagram for the compilation of source files. The example shown in FIG. 3 illustrates compilation of three source files (302, 304, and 306) with separate compilation and linking steps. A first command Xdcc main.c add.c mult.c -c -hw mult causes compiler 310 to compile source files 302, 304, and 306 to create respective object files 322, 324, and 326. The -c option causes the source files to be compiled to form object files but not linked into an executable 340. Alternatively, compilation of source files 302, 304, and 306 into object files 322, 324, and 326 may be performed using the following three separate compilation commands.

Xdcc main.c -c
Xdcc add.c -c
Xdcc mult.c -c -hw mult.

As explained with reference to FIG. 2, the -hw option in the last of the three commands causes the compiler 310 to generate a netlist 328 for the "mult" function indicated in the following field of the command. The netlist 328 includes RTL code that describes circuitry to implement the mult function included in the mult.c source file. The compiler replaces the function mult in the source file mult.c with interface code for communication with the circuit implemented from netlist 328 and compiles the modified source file to create object file mult.o 326. In some implementations, the netlist 328 for the function is appended to the object file 326 generated for the source file in which the function is included.

As indicated with reference to FIG. 1, in some implementations, the compiler 310 creates a metadata file to temporarily store data related to the function listed in the -hw option. For example, as indicated above, the metadata file 312 may include data for each function indicated by the -hw option and may include data pointers to various files associated with the functions to be implemented in hardware (e.g., source files, object files, and/or netlists corresponding to the function).

In response to a second command, such as:

Xdcc main.o add.o mult.o -platform target -o app.elf -hw mult linker 330 links the object files 322, 324, and 326 to create an executable app.elf 340. The -hw option directs the linker to synthesize, place, and route netlists corresponding to functions to be implemented in hardware, and to generate configuration data stream 342. In some implementations, the linker creates a temporary link file 332 to facilitate various linking processes. Information contained in an example link file is discussed in more detail with reference to FIG. 6.

In some implementations, -hw options may be omitted from the second command. For instance, the meta-data file may include data that indicates the hardware-accelerated functions specified by the -hw option. In which case, the option -hw mult may be omitted from the command, as shown in FIG. 3.

Figure 4:
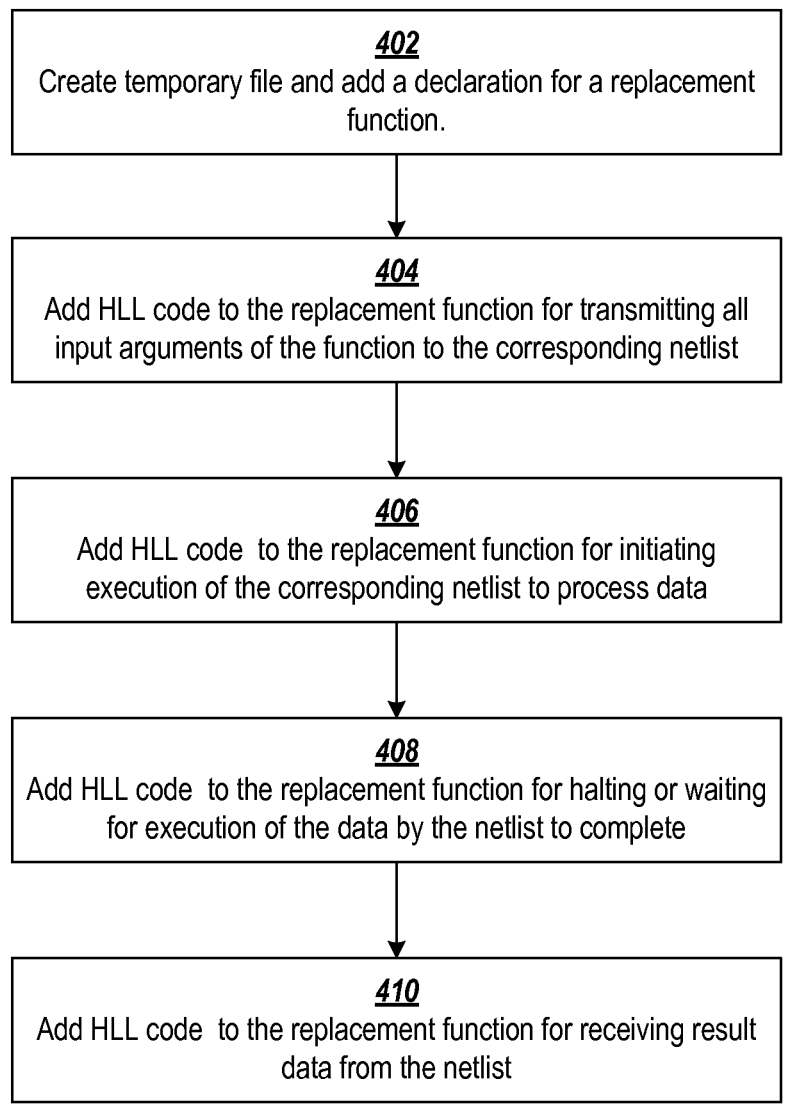
FIG. 4 shows a process for generation of HLL code for communication with a function to be implemented in hardware.

FIG. 4 shows a process for generation of HLL interface code for communication with a function to be implemented in hardware. At block 402, a temporary file is created to store the generated interface code and a declaration for a replacement function, which will contain code to replace the original function in the source file, is added to the temporary file. This replacement function has the same interface as the original function. At block 404, HLL code is added to the body of the replacement function, and the added code directs transmission of all input arguments to the function to a corresponding netlist. HLL code is added to the body of the replacement function at block 406 to initiate execution of the corresponding netlist to process data. HLL code is added to the body of the replacement function at block 408 to cause the HLL function to halt or wait for processing of the data by the netlist to complete. At block 410, HLL code is added to the body of the replacement function to receive result data from the netlist. In some implementations, the code generated at blocks 404 and 410 calls additional lower level interface code for communication with the netlist that is generated later at link time (once data sizes are resolved). Interface code is described in more detail with reference to FIG. 6. Referring again to FIG. 3, the compiler 310 replaces the function to be implemented in hardware (e.g., in HLL source file 306) with the replacement function and the result is compiled to create object file 326.

Figure 5:
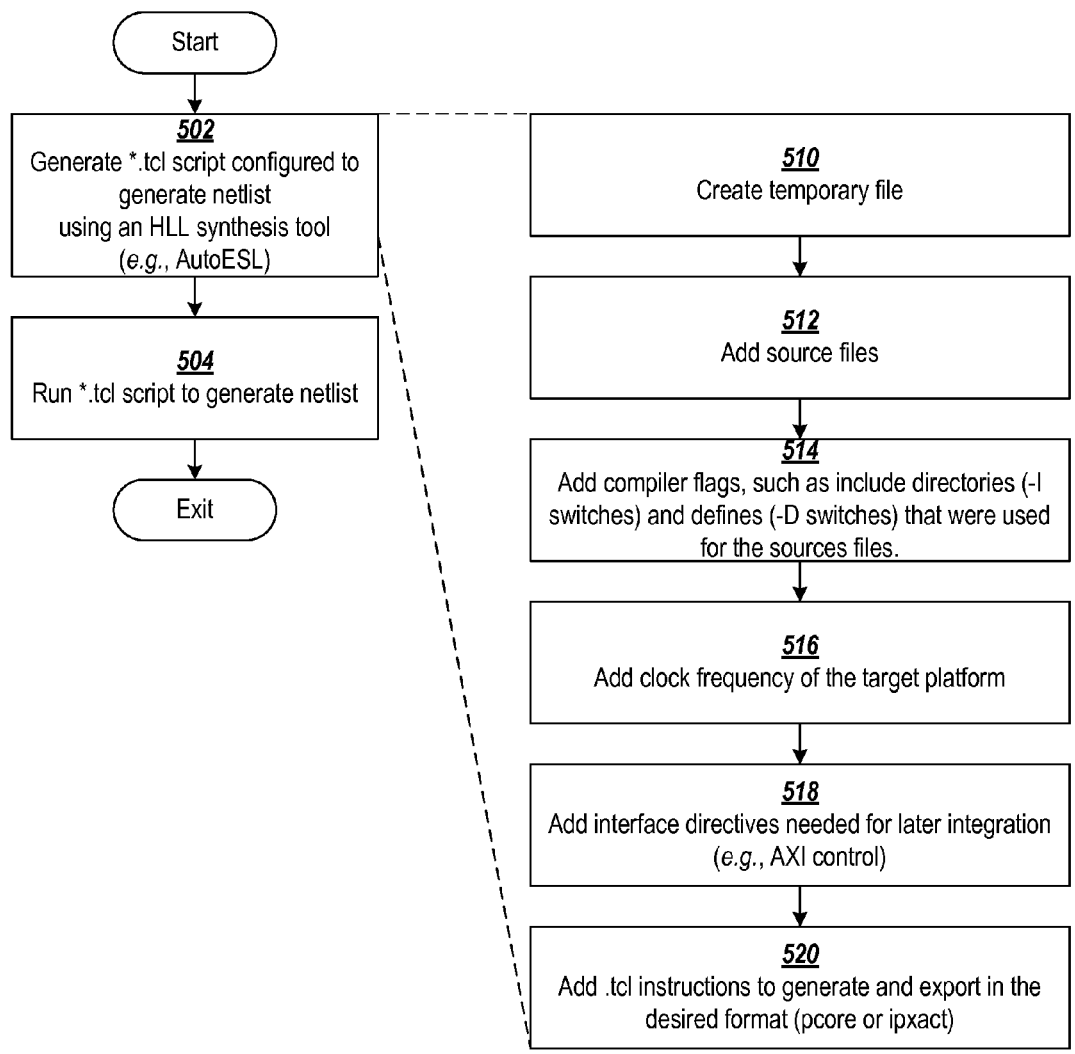
FIG. 5 shows a process for generation of a netlist from HLL code of a function.

FIG. 5 shows a process for generation of a netlist from HLL code of a function. At block 502, an executable script (e.g., Tool Command Language, TCL, script) is generated, and the script is configured to generate a netlist using an HLL synthesis tool (e.g., the Vivado HLS synthesis tool). The script is then executed at block 504 to generate a netlist.

The executable script is generated at block 502 by the processes performed at blocks 510, 512, 514, 516, 518, and 520. A temporary file is created to store the executable script at block 510. Pointers to the source files (e.g., 104) are added to the temporary file at block 512. Compiler flags, such as include directories, included in the command (e.g., 102) or a make file are added to the temporary file at block 514. A selected clock frequency of the target platform is added to the file at block 516. Interface directives needed for later integration (e.g., AXI control) are added to the file at block 518. At block 520, executable script instructions are added to the temporary file that are configured to cause the netlist to be generated (e.g., using a netlist synthesis tool) and exported in the desired format (pcore or ipxact). The temporary file may be deleted after netlists (e.g., 118) are generated (e.g., at block 116).

Figure 6:
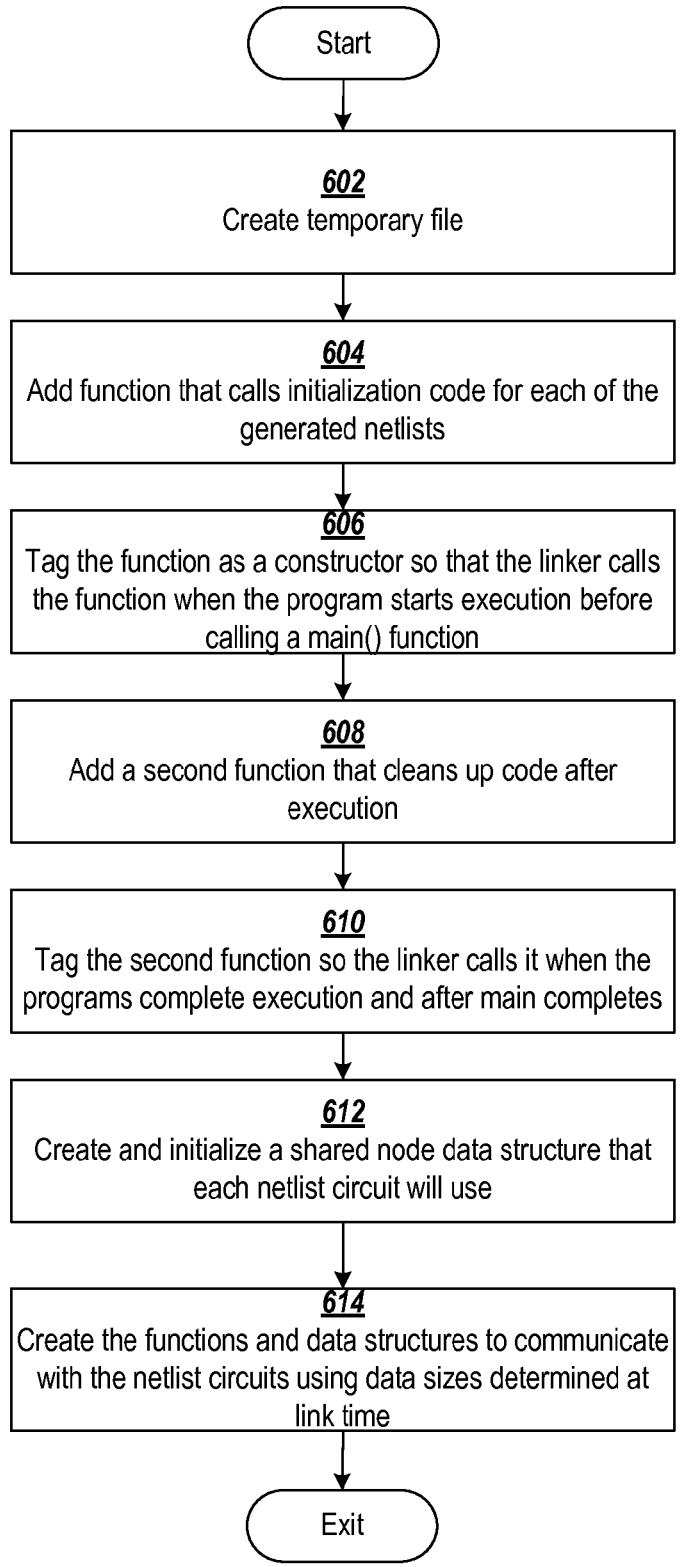
FIG. 6 shows a process for creation of a file created at link time that may be used to facilitate the compilation process.

FIG. 6 shows a process for creation of a temporary file at link time (e.g., link file 332) that may be used to add code that can only be determined at link time. This file is an HLL file that gets compiled into an object file and linked along with the rest of the object files. A temporary file is created at block 602. A first function that calls initialization code for each of the netlists is added to the temporary file at block 604. For instance, in some implementations, the initialization code allocates memory and processor resources for the interface code that establishes a link between the netlists and the executable program. The first function is tagged at block 606 so it will be included and executed in the executable program (e.g., 340) prior to the functions of the source files (e.g., prior to execution of the "main" function). At block 608, a second function is added to the temporary file to perform clean up operations (e.g., return allocated memory and processor resources), and at block 610 the second function is tagged to be executed in the executable program after execution of the main function has completed. A shared node data structure is created and initialized for maintaining a shared set of global variables for generated netlists at block 612.

Functions and data structures to transmit data to and receive data from circuits implemented from the netlists, are created and added to the file at block 614. An interface code function is created to communicate data between the executable program and the interface circuit. This function may be called by the HLL interface code that was added at blocks 404 and 410 in FIG. 4. The functions generated at block 614 are configured to transmit and receive data using a resolved data size that is determined at link time based on the requirements of the various netlists. In some implementations pre-developed interface functions may be retrieved from a data base library. The library may include different interface functions for different data sizes and communication protocols. Depending on the target programmable IC and application, data signals may be communicated between the programmed processor and the circuit design using a number of communication protocols including, for example, AXI4-stream, AXI4-Lite, AXI4-MM, or PCIe.

Figure 7:
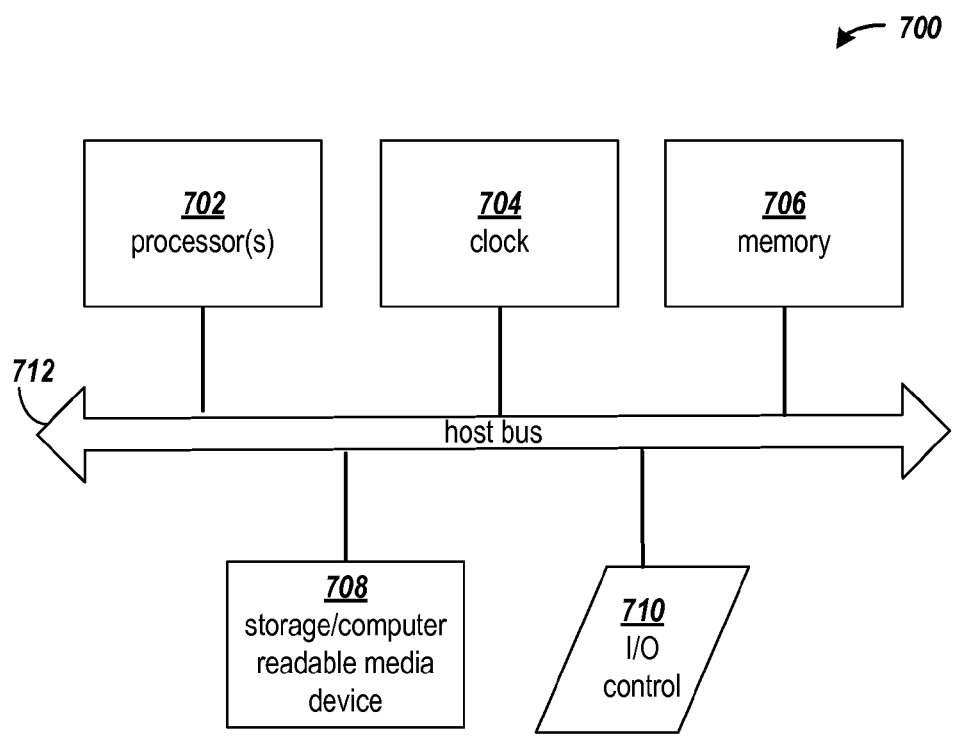
FIG. 7 shows a computing arrangement that may be used to perform one or more of the processes disclosed herein.

FIG. 7 shows a computing arrangement that may be used to perform one or more of the processes disclosed herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory arrangement 706, a storage arrangement 708, and an input/ output control unit 710, all coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 702 may be one or more general-purpose processors, or a combination of one or more general-purpose processors and suitable co-processors, or one or more specialized processors (e.g., RISC, CISC, pipelined).

The memory arrangement 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory arrangement 706 and storage arrangement 708 may be combined in a single arrangement.

The processor(s) 702 executes the software in storage arrangement 708 and/or memory arrangement 706, reads data from and stores data to the storage arrangement 708 and/or memory arrangement 706, and communicates with external devices through the input/output control arrangement 710. These functions are synchronized by the clock signal generator 704. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures of the different disclosed implementations.

The disclosed method and system are thought to be applicable to a variety of systems for software development and compilation. Other aspects and features will be apparent to those skilled in the art from consideration of the specification. For instance, although implementations may in some cases be described in individual figures, it will be appreciated that features from one figure can be combined with features of another figure even though the combination is not explicitly shown or explicitly described as a combination. The method and system may be implemented with one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method for compiling a high-level language (HLL) program, comprising:
    performing on a programmed processor operations including:
        inputting a command having a first field that indicates a set of one or more HLL source files to be compiled and a second field that indicates a set of one or more functions that are to be implemented on programmable circuitry of a programmable integrated circuit (IC);
        for each HLL source file of the set:
            in response to the HLL source file including one or more functions of the set:
                for each of the one of more functions of the set:
                    generating a respective netlist from HLL code included in the function;
                    generating interface code for communication with the netlist;
                    wherein the generating of the interface code for communication with the netlist includes:
                        generating code configured and arranged to communicate input arguments of the HLL source file to the netlist:
                        generating code that triggers execution of the netlist;
                        generating code that causes execution of the HLL code to halt; and
                        generating code configured and arranged to receive result data from the netlist; and
                    replacing HLL code of the function in the HLL source file with the generated interface code;
            compiling the HLL source file to produce a respective object file; and
            appending the netlist generated for one of the one or more functions of the set to the object file compiled from the HLL source file that includes the one of the one or more functions of the set;
        linking each of the object files to generate a program executable on a processor of the programmable IC; and
    generating a configuration data stream that implements each generated netlist on the programmable circuitry of the programmable IC.

2. The method of claim 1, wherein the generating of the respective netlist from the HLL code included in the function includes generating an executable script configured and arranged to generate the netlist using an HLL synthesis tool.

3. The method of claim 2, wherein the generating of the respective netlist from the HLL code included in the function includes:
    executing the executable script to cause the HLL synthesis tool to convert each function call in the HLL code included in the function into a register-transfer-level circuit.

4. The method of claim 3, wherein the generating of the respective netlist from the HLL code included in the function includes generating a simulation model of the netlist.

5. The method of claim 1, wherein the generating of the interface code includes generating HLL code.

6. The method of claim 1, wherein the generating the configuration data stream includes performing synthesis, placement, and routing of the netlist for a target platform.

7. The method of claim 1, wherein the linking each of the object files includes creation of a link file having initialization code for each netlist generated from the HLL code.

8. The method of claim 1, further comprising creating a metadata file having data that indicates hardware-accelerated functions specified by the second field of the command.

9. A method for compiling a high-level language (HLL) program, comprising:
    performing on a programmed processor operations including:
        in response to a first command with a first field that indicates a set of one or more HLL source files to be compiled and a second field that indicates a set of one or more functions that are to be implemented on programmable circuitry of a programmable integrated circuit (IC), for each HLL source file of the set:
            in response to the HLL source file including one or more functions of the set:
                for each of the one of more functions of the set:
                    generating a respective netlist from HLL code included in the function;

generating HLL interface code for communication with the netlist; and
replacing HLL code of the function in the HLL source file with the generated HLL interface code;
compiling the HLL source file to produce a respective object file; and
appending the netlist generated for one of the one or more functions of the set to the object file compiled from the HLL source file that includes the one of the one or more functions of the set;
creating a metadata file having data that indicates hardware-accelerated functions specified by the second field of the command; and
in response to a second command:
linking each of the object files to generate an executable program configured for execution on a processor of the programmable IC; and
generating a configuration data stream that implements each generated netlist on the programmable circuitry of the programmable IC.

10. The method of claim 9, wherein the generating a respective netlist from the HLL code included in the function includes generating an executable script configured and arranged to generate the netlist using an HLL synthesis tool.

11. The method of claim 10, wherein the HLL synthesis tool is configured to convert each function call in the HLL code included in the function into a register-transfer-level circuit.

12. The method of claim 11, wherein the generating a respective netlist from the HLL code included in the function includes generating a simulation model of the netlist.

13. The method of claim 9, wherein the generated interface code for communication with the netlist includes:
code configured and arranged to communicate input arguments of the HLL source file to the netlist;
code that triggers execution of the netlist;
code that causes execution of the HLL code to halt; and
code configured and arranged to receive result data from the netlist.

14. The method of claim 13, wherein the generated interface code is HLL code.

15. The method of claim 9, wherein the generating the configuration data stream includes performing synthesis, placement, and routing of the netlist for a target platform.

16. The method of claim 9, wherein the linking each of the object files includes creation of a link file having initialization code for each netlist generated from the HLL code.

\* \* \* \* \*